United States Patent [19]

Chang et al.

[11] 4,203,889

[45] May 20, 1980

[54] POLYURETHANE COMPOSITIONS STABILIZED WITH KETOXIMES

[75] Inventors: Eugene Y. C. Chang; Samuel Kaizerman, both of Somerville, N.J.

[73] Assignee: American Cyanamid Co., Stamford, Conn.

[21] Appl. No.: 534,026

[22] Filed: Dec. 18, 1974

Related U.S. Application Data

[63] Continuation of Ser. No. 371,816, Jun. 20, 1973, abandoned.

[51] Int. Cl.² .............................................. C08K 5/34
[52] U.S. Cl. ...................... 260/45.8 NT; 260/15.9 L; 260/45.95 F; 260/45.95 R
[58] Field of Search ................ 260/77.5 TB, 45.95 H, 260/45.95 B, 45.8 NT, 45.95 F, 45.95 L

[56] References Cited

U.S. PATENT DOCUMENTS

| 3,438,922 | 4/1969 | Veno et al. .................... 260/77.5 TB |
| 3,475,383 | 10/1969 | Stewart ................... 260/77.5 |
| 3,554,962 | 1/1971 | Fischer .................. 260/77.5 |
| 3,706,701 | 12/1972 | Susi ................. 260/45.95 R |
| 3,723,372 | 3/1973 | Wakimoto et al. .......... 260/77.5 TB |
| 3,751,375 | 8/1973 | Bender et al. ............... 260/45.95 H |
| 3,846,378 | 11/1974 | Griswold ..................... 260/77.5 TB |

FOREIGN PATENT DOCUMENTS 1186649  4/1970 United Kingdom ............ 260/77.5 TB

*Primary Examiner*—V. P. Hoke
*Attorney, Agent, or Firm*—Frank M. Van Riet

[57] ABSTRACT

A polyurethane polymer stabilized against the deteriorative effects of ultraviolet light and nitrogen oxides is provided comprising the polymer combined with a stabilizing amount of an oxime of an aliphatic or cycloaliphatic ketone.

22 Claims, No Drawings

POLYURETHANE COMPOSITIONS STABILIZED WITH KETOXIMES

This is a continuation of application Ser. No. 371,816, filed June 20, 1973, now abandoned.

Generally stated, the subject matter of the present invention relates to stabilized polyurethanes. More particularly, the invention relates to polyurethanes stabilized against the degradative effects of ultraviolet light and nitrogen oxides.

BACKGROUND OF THE INVENTION

Polyurethanes are subject to deterioration when exposed to ultraviolet light or nitrogen oxide fumes. This deterioration is manifested by a discoloration of the polyurethane, usually yellow to brown. It is particularly apparent in films prepared from polyether based polyurethanes chain extended with water. This discoloration is also noticed in polyurethanes prepared from polyesters, as well as in shaped articles such as fibers.

The discoloration due to ultraviolet light can be reduced by the addition of the polyurethane of an ultraviolet absorber; however, the ultraviolet absorber has little or no effect in protecting the polymer against nitrogen oxide fumes. The addition of a commonly used hindered phenol antioxidant will serve to reduce the deterioration due to nitrogen oxide fumes; however, there is little to no effect in reducing ultraviolet light degradation. Combinations of ultraviolet absorber and antioxidant can and have been used successfully. Note U.S. Pat. No. 3,379,675, Jensen et al, wherein a combination of 2,2'-(o-hydroxyphenyl)benzotriazole and 1,3,5-trimethyl-2,4,6-tris(3,5-di-t-butyl-4-hydroxybenzyl)benzene is added to a polyether based spandex fiber. The combination is reported to produce a synergistic effect which is greater than that expected from the simple additive effects of the two types of stabilizers used separately. The above phenolic compound and 1,2,4,5-tetramethyl-3,6-bis(3,5-di-t-butyl-4-hydroxybenzyl)benzene are reported to stabilize polyether based spandex fibers against deterioration due to acid fumes; see U.S. Pat. No. 3,395,114, Smith.

The present invention represents the culmination of a long series of investigations conducted largely by the inventors directed to overcoming the inherent problems of ultraviolet light and nitrogen oxide degradation of polyurethane polymers.

Accordingly, it is the primary object of the present invention to provide a polyurethane polymer stabilized against the degradative effects of ultraviolet light and nitrogen oxide fumes.

Another object of the invention is to provide a process for avoiding the deterioration of polyurethane polymers.

Generally then, it is an object of this invention to provide polyurethane polymers which are stable against the deterioration of ultraviolet light and nitrogen oxide fumes.

Additional objects and advantages of the invention will be set forth in part in the description which follows and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to a polyurethane stabilized against the deteriorative effects of ultraviolet light and nitrogen oxides, which comprises a stabilizing amount of an oxime of an aliphatic or cycloaliphatic ketone, said polyurethane being the reaction product of a polyether, a polyester or a polyformal polyol, an aromatic diisocyanate, and optionally, a low molecular weight compound containing at least two active hydrogen atoms which display activity according to the Zerewitinoff test.

In addition, the invention also relates to a process for stabilizing polyurethanes, from deterioration due to nitrogen oxides and ultraviolet light, which comprises adding a stabilizing amount of an oxime of aliphatic or cycloaliphatic ketone.

It is to be understood that both the foregoing general description and the following detailed description are exemplary and explanatory and are not restrictive of the invention.

The present invention is based on the discovery that polyurethane shaped articles, especially water-extended polyether-based films, are stabilized against both ultraviolet light and nitrogen oxide fumes with a high degree of effectiveness by the addition thereto of an oxime of an aliphatic or cycloaliphatic ketone.

The present invention differs from the prior art methods in the use of a ketoxime to improve the color of polyurethanes on exposure to ultraviolet light and nitrogen oxide fumes. It has advantages over known methods of stabilization in that the ketoximes additionally improve the effectiveness of either the ultraviolet absorber or antioxidant or both in combination. The highest overall effectiveness is obtained with a combination of ketoxime, ultraviolet absorber and antioxidant.

The polyurethane stabilized according to the present invention can be either polyether- polyester- or polyformal-based and be in the form of shaped articles such as films, fibers, compression molded or cast articles, coatings, extruded or injection molded articles, and the like. The beneficial effects of the invention, however, are most apparent in films, which includes coatings, produced from polyether-based polyurethanes chain-extended with water.

The polyethers used in the preparation of the polyurethanes of this invention derive from lower alkylene oxides and have molecular weights in the range of from about 500 to 5,000, preferably 1,000 to 3,000. Typical of the polyethers are polyethylene ether glycol, polypropylene ether glycol, and polytetramethylene ether glycol, particularly the latter.

The polyformals are derived from the condensation reaction of an α,ω-glycol and formaldehyde under acidic catalysis. The polyformals are hydroxyl terminated and have a molecular weight in the range of about 500 to 5,000, preferably 1,000 to 3,000. Typical polyformals are poly-1,6-hexane formal, poly-1,5-pentane formal and the polyformals from thiodiethanol and diethylene glycol among others. Poly-1,6-hexane formal is preferred.

The polyesters are prepared according to well known methods by the condensation of an aliphatic glycol, such as ethylene glycol, propylene glycol, 1,4-butandiol, hexamethylene glycol, and the like, with an aliphatic dicarboxylic acid or anhydride, such as succinic acid (or anhydride), adipic acid, pimelic acid, sebacic acid, suberic acid, and the like. They are hydroxyl terminated and have molecular weights in the range of from about 500 to 5,000. Mixtures of polyesters and polyethers may also be used.

The hydroxyl terminated polyethers, polyesters or polyformals are reacted with an aromatic diisocyanate and, optionally, a low molecular weight compound containing at least two active hydrogen atoms which display activity according to the Zerewitinoff test, by well-known procedures. Thus, the polymeric diol may be reacted initially with an excess of an aromatic diisocyanate to form a prepolymer, which is then chain extended with said low molecular weight compound, or the reactants, including the low molecular weight compound, may be combined and reacted together at one time. In any case, regardless of the methods employed to prepare the polyurethane, the present invention is beneficial in reducing the deterioration of the polymer caused by ultraviolet light and nitrogen oxide fumes.

Suitable aromatic diisocyanates include 2,4-tolylene diisocyanate, 2,6-tolylene diisocyanate (and mixtures of the two isomers), p-phenylene diisocyanate, 4,4'-biphenylene diisocyanate, methylenebis (phenylisocyanate) and the like. The diisocyanate is not critical to the invention.

In the preparation of the polyurethanes it is sometimes desirable to incorporate a small amount of a triol, in addition to the polyol to reduce the ultimate elongation to a lower level, if desired. A suitable triol is trimethylol propane.

In a preferred embodiment of the invention, wherein the prepolymer is chain-extended with water, it is desirable to incorporate into the prepolymer an emulsifiable group, e.g. a carboxyl group. This may be introduced into the prepolymer by including the total polyol content a compound such as dihydroxymethyl propionic acid. The compound is incorporated into the prepolymer by virtue of the hydroxyl groups and the resulting prepolymer will contain pendant carboxyl groups. However, emulsifiable groups can be introduced into the prepolymer by any known means, such as described e.g., in British Pat. No. 1,078,202. When such a prepolymer is contacted with water containing a salt forming compound, e.g. triethylamine, the polymer is immediately emulsified. Thus, the chain-extended polymer is ready for use in film-forming as a stable latex. A latex may also be formed by contacting the prepolymer with water containing an emulsifying agent.

The oximes useful in this invention are formed by the reaction of aliphatic or cycloaliphatic ketones with hydroxylamine. The preferred ketoximes are acetoxime and cyclohexanone oxime. Other suitable ketoximes include the oximes of methyl ethyl ketone, diethyl ketone, diisopropyl ketone, cyclopentanone, cyclohexanone, and the like.

The ultraviolet absorbers which may be used in combination with the ketoximes and phenolic antioxidants include:

A. 2-Hydroxybenzophenones: especially 2-hydroxybenzophenones with at least one additional substituent, for example 2-hydroxy-4-methoxybenzophenone 2,4-dihydroxybenzophenone, 2,2'-dihydroxy-4-methoxybenzophenone, 2,2',4,4'-tetrahydroxybenzophenone, 2,2'-dihydroxy-4,4'-dimethoxybenzophenone, 2-hydroxy-4-butoxybenzophenone, 2-hydroxy-4-octyloxybenzophenone, 2-hydroxy-4-dodecyloxybenzophenone, and the like. This type of ultraviolet absorber is described in U.S. Pat. Nos. 2,777,838 issued Jan. 15, 1967; 2,682,559 issued June 29, 1954; 2,693,492 issued Nov. 2, 1954; 2,861,053 issued Nov. 18, 1958; 2,919,259 issued Dec. 29, 1959; 2,976,259 issued Mar. 21, 1961; 3,006,959 issued Oct. 31, 1961; and 3,098,842 issued July 23, 1963.

B. Benzotriazoles: especially the 2-(2-hydroxyphenyl)-benzotriazoles such as 2-(2-hydroxy-5-methylphenyl) benzotriazole, 2-(2-hydroxy-5-octylphenyl)-benzotriazole, 2-(2-hydroxy-4-methoxyphenyl)benzotriazole, 2-(2-hydroxy-3-t-butyl-5-methylphenyl)benzotriazole, 2-(2-hydroxy-3,5-di-t-butylphenyl)benzotriazole, 2-(2-hydroxy-3,5-di-t-amylphenyl) benzotriazole, 2-(2-hydroxy-3,5-di-t-butyl-phenyl)-5-chlorobenzotriazole, 2-(2-hydroxy-3-t-butyl-5-methylphenyl)-5-chlorobenzotriazole, and the like. This class of ultraviolet absorber is described in U.S. Pat. Nos. 3,004,896 issued Oct. 17, 1961; 3,018,269 issued Jan. 23, 1962; 3,271,339 issued Sept. 6, 1966.

C. Benzylidene-malonic esters: Diethyl-p-methoxybenzylidenemalonate, diethyl o-methoxybenzylidenemalonate, diethyl p-hydroxybenzylidenemalonate, diethyl diphenylmethylenemalonate, and the like. This class of ultraviolet absorbers is disclosed in application Ser. No. 389,210, filed Aug. 12, 1964. Additional ultraviolet absorbers of the class are also disclosed in U.S. Pat. No. 3,244,668 issued Apr. 5, 1966.

The phenolic antioxidants useful in combinations of this invention include: 2,6-di-t-butylphenol, 2,6-di-t-butyl-p-cresol, 2,2'methylenebis(4-methyl-6-t-butylphenol), 2,2'-methylenebis-(4-ethyl-6-t-butylphenol), 4,4'-butylidenebis(6-t-butyl-m-cresol), 4,4'-methylenebis(2,6-di-t-butylphenol), 4,4'-thiobis(6-t-butyl-o-cresol, 4,4'-thiobis(6-t-butyl-m-cresol), styrenated phenols and styrenated cresols, such as Wingstay S, and the like.

The ketoxime may be incorporated into the polymer in a number of ways. The preferred method is to add the ketoxime in the latter stage of prepolymer formation (Example II). The ketoxime may be added to the diisocyanate to form the diisocyanate-ketoxime adduct and the adduct mixed with the prepolymer (Example XII). Another method for incorporating the ketoxime is to form an adduct with the prepolymer and blend the adduct with a separate portion of prepolymer (Example XIII). Alternatively, the oxime may be employed as an adduct of an aliphatic or cycloaliphatic mono or diisocyanate. In such instances the adduct is prepared by reacting the oxime with a stoichiometric amount of the isocyanate. In whatever form it is added the ketoxime is used in an amount of from about 0.1 to about 5 percent based on the weight of prepolymer, preferably from about 0.5 to 1 percent.

The following is illustrative of the effectiveness of the invention: The latex is cast into 15–20 mil films on glass plates and dried. The films are then tested according to Standard Test Method AATCC 16A-1964, Colorfastness to Light:Carbon - Arc Lamp, Continuous Light, using a Fade-Ometer; time of exposure 80 hours. The films are also exposed to nitrogen oxide fumes according to Standard Test Method AATCC 23-1962, Colorfastness to Oxides of Nitrogen in the Atmosphere, time of exposure 32 hours. The yellowness or Yellow Index of the samples after exposure is determined using ASTM D-1965 with a Hunterlab Model D25 Color and Color Difference Meter.

The following examples are provided for illustrative purposes and may include particular features of the invention. However, the examples should not be construed as limiting the invention, many variations of which are possible without departing from the spirit or scope thereof.

EXAMPLE I

Preparation of Polyurethane Latex

Polypropylene glycol, 1820 grams, 1.0 mole, trimethylolpropane, 26.8 grams, 0.2 mole, dihydroxymethylpropionic acid, 65.0 grams, 0.48 mole, and 80/20-tolylene diisocyanate, 526 grams, 3.02 moles, were reacted at 80° C. for 20 hours to form an isocyanate terminated prepolymer.

A 100 gram portion of the prepolymer, containing about 0.02 mole of carboxyl group, was poured into a stirred Waring Blendor containing 150 ml. water and 2.02 grams of triethylamine (100 percent stoichiometric amount based on the carboxyl groups present). The prepolymer was immediately emulsified. After about two minutes the contents were transferred to a stirred flask and allowed to continue reaction for about 10 to 20 hours. The resulting emulsion has a solids content of about 40 percent.

A 15 to 20 mil film was cast on a glass plate and air dried for about 16 to 24 hours at room temperature, followed by 30 minutes at 100° C. in a circulating air oven. The film was tested as described above with the results shown below.

Table 1

| Fade-O-Meter Test | | Gas Test |
|---|---|---|
| Time | 80 hours | 32 hours |
| Yellow Index | 41.0 | 30.6 |

EXAMPLE II

This example illustrates the improvement in color development in the film by the addition of 0.5 percent by weight of acetoxime.

The procedure of Example I was repeated except that the isocyanate terminated prepolymer was reacted with 0.5 percent by weight of acetoxime for an additional 30 minutes at 80° C. Prior to the emulsification step.

Table 2

| Fade-O-Meter Test | | Gas Test |
|---|---|---|
| Time | 80 hours | 32 hours |
| Yellow Index | 33.2 | 9.9 |

EXAMPLE III

This example shows that significant improvement in resistance to color development due to gas exposure is obtained by the addition of an antioxidant, but the ultraviolet light resistance becomes inferior.

The procedure of Example I was followed except that an antioxidant, 2,2'-methylene bis(4-methyl-6-tert. butyl phenol), was incorporated into the prepolymer during preparation at 0.5 percent by weight.

Table 3

| Percent Antioxidant | Fade-O-Meter Test | | Gas Test |
|---|---|---|---|
| 0.5 | Time | 80 hours | 32 hours |
| | Yellow Index | 53.9 | 10.6 |

EXAMPLE IV

This example illustrates the excellent results obtained by a combination of antioxidant and oxime in preventing color development in the film.

The procedure of Example III was followed except that 0.5 percent by weight of antioxidant was added and 0.5 percent by weight of acetoxime was added toward the end of the prepolymer preparation as in Example II.

Table 4

| Fade-O-Meter Test | | Gas Test |
|---|---|---|
| Time | 80 hours | 32 hours |
| Yellow Index | 20.7 | 7.4 |

EXAMPLE V

This example shows that the ultraviolet absorber protects the film against ultraviolet light but is ineffective against color formation due to nitrogen oxides.

The procedure of Example I was followed except that a UV absorber was added toward the end of the prepolymer preparation and allowed to react for an additional 15 minutes.

Table 5

| Percent 2,2'-dihydroxy-4-methoxy benzophenone | Fade-OMeter Test | | Gas Test |
|---|---|---|---|
| | Time | 80 hours | 32 hours |
| 0.5 | Yellow Index | 19.2 | 38.8 |
| 1.0 | Yellow Index | 11.2 | 40.0 |

EXAMPLE VI

Same as Example V except that 0.5 percent acetoxime was added toward the end of the prepolymer preparation and allowed to stir an additional 30 minutes at 80° C.

Table 6

| | | Fade-O-Meter Test | Gas Test |
|---|---|---|---|
| (0.5 percent UV absorber) +0.5 percent acetoxime | Time Yellow Index | 80 hours 16.8 | 32 hours 13.0 |

The data show a considerable improvement in the gas test due to the addition of acetoxime.

EXAMPLE VII

Same as Example III (0.5 percent antioxidant) except that 0.5 percent of 2,2'-dihydroxy-4-methoxy benzophenone was further added at the end of the prepolymer preparation and stirred for an additional 15 minutes at 80° C.

Table 7

| Fade-O-Meter Test | | Gas Test |
|---|---|---|
| Time | 80 hours | 32 hours |
| Yellow Index | 33.5 | 24.2 |

EXAMPLE VIII

Same as Example VII but with 0.5 percent acetoxime added at the end of the prepolymer preparation and stirred for an additional 15 minutes.

Table 8

| Fade-O-Meter Test | | Gas Test |
|---|---|---|
| Time | 80 hours | 312 hours |
| Yellow Index | 21.7 | 10.7 |

The data show the improvement due to acetoxime.

EXAMPLE IX

Same as Example II except that the oximes shown below were added instead of acetoxime.

Table 9

| Oxime | Percent | Fade-O-Meter Test | Gas Test |
|---|---|---|---|
|  |  | 80 hours | 32 hours |
| 2-butanone oxime | 0.5 | 34.8 | 14.7 |
| cyclohexanone oxime | 1.0 | 36.0 | 14.7 |
| cyclopentanone oxime | 1.0 | 35.4 | 12.6 |
| acetophenone oxime | 1.0 | 55.2 | 11.9 |
| benzophenone oxime | 1.0 | — | 30.0 |

The data show that the aromatic ketone oximes do not perform as well as the aliphatic ketone oximes, although the acetophenone oxime is good in the gas test.

EXAMPLE X

| Stabilizer | Percent | Yellow Index Fade O-Meter | Gas Test |
|---|---|---|---|
|  |  | 80 hours | 32 hours |
| Control | — | 43.5 | 33.9 |
| Acetoxime | 0.5 | 33.2 | 9.9 |
| Cyclohexanone oxime | 0.5 | 36 | 14.7 |
| Antioxidant (a) | 0.5 | 33 | 23.6 |
| UV Absorber (b) | 0.5 | 12.1 | 27 |
| Antioxidant (a) | 0.5 | 13.5 | 23.2 |
| UV absorber (b) | 0.5 | — | — |
| Antioxidant (a) | 0.5 | 10.4 | 13.6 |
| UV Absorber (b) | 0.5 |  |  |
| Acetoxime | 0.5 |  |  |
| Antioxidant (a) | 0.5 | 10.5 | 14.1 |
| UV Absorber (b) | 0.5 |  |  |
| Cyclohexanone oxime | 0.5 |  |  |
| UV Absorber (c) | 1.0 | 38 | 23 |
| Antioxidant (a) | 0.5 |  |  |
| UV Absorber (c) | 0.5 | 34 | 12.8 |
| Antioxidant (a) | 0.5 |  |  |
| Acetoxime | 0.5 |  |  |
| UV Absorber (c) | 0.5 | 34 | 14.5 |
| Antioxidant (a) | 0.5 |  |  |
| Cyclohexanone oxime | 0.75 |  |  |

EXAMPLE XI

Table 11

| Stabilizer | Percent | Yellow Index Fade-O-Meter 80 Hours | Gas Test 32 Hours |
|---|---|---|---|
| Control | — |  | 30.6 |
| Acetoxime | 0.5 | 33.2 | 9.9 |
| UV Absorber (a) | 0.5 | 19.2 | 38.8 |
| Antioxidant (b) | 0.5 | 44.3 | 21.3 |
| Antioxidant (b) | 0.5 | 30 | 11.2 |
| Acetoxime | 0.5 |  |  |
| Antioxidant (b) | 0.5 | 20 | 21 |
| UV Absorber (a) | 0.5 |  |  |
| Antioxidant (b) | 0.5 | 18 | 11.6 |
| UV Absorber (a) | 0.5 |  |  |
| Acetoxime | 0.5 |  |  |
| Antioxidant (c) | 0.5 | 41.5 | 18.1 |
| Antioxidant (c) | 0.5 | 35.5 | 8.9 |
| Acetoxime | 0.5 |  |  |
| Antioxidant (c) | 0.5 | 23 | 18.4 |

Table 11-continued

| Stabilizer | Percent | Yellow Index Fade-O-Meter 80 Hours | Gas Test 32 Hours |
|---|---|---|---|
| UV Absorber (a) | 0.5 |  |  |
| Antioxidant (c) | 0.5 | 20.1 | 9.0 |
| UV Absorber (d) | 0.5 |  |  |
| Acetoxime | 0.5 |  |  |

(a) Cyasorb 24: 2,2'-dihydroxy-4-methoxybenzophenone
(b) Winstay L: Reaction product of dicyclopentadiene, formaldehyde and isobutylene
(c) Cyanox 96: predominatly 2,2'-methylene bis(6-nonyl-p-cresol)

EXAMPLE XII

Acetoxime, 25 grams, was dissolved in 100 ml. of toluene. To this solution was added 14.37 grams, 0.0575 mole, of 4,4'-diisocyanatodiphenyl methane (MDI) dissolved in 100 ml. of toluene. The solution was allowed to react for one hour and the resulting precipitate (adduct of MDI+acetoxime) filtered and recrystallized twice from chlorobenzene, m.p. 139°–142° C.

The procedure of Example II was followed except that the above adduct was added to the prepolymer instead of acetoxime.

Table 12

| Adduct Conc., Percent | Fade-O-Meter Test | | Gas Test |
|---|---|---|---|
| Time | 20 hours | 80 hours | 32 hours |
| 0.5 Yellow Index | 24.6 | 40.3 | 16.0 |
| 1.0 Yellow Index | 23.4 | 34.4 | 12.8 |
| 4.0 Yellow Index | 16.8 | 34.6 | 11.9 |

This example illustrates the use of an oxime-diisocyanate adduct in prevention of color development in polyurethane films.

EXAMPLE XIII

A prepolymer having an NCO content of 6.18 percent was made from polypropylene glycol, MW 1000, 1000 grams, 1.0 mole, and 348 grams, 2.0 moles, of 80/20-tolylene diisocyanate, by reacting at 80° C. for 18 hours. 190 grams of the prepolymer was reacted with 20.5 grams of acetoxime (a stoichiometric amount based on the NCO content) at 50° C. After 2 hours at 50° C. the reaction was stopped and an IR spectrum of the adduct taken. No NCO bands were present in the spectrum. Oxime content was 9.8 percent.

The above adduct, 10 percent by weight, was blended with the prepolymer of Example I. No additional acetoxime was added.

Table 13

| Fade-O-Meter Test | | Gas Test |
|---|---|---|
| 20 hours | 80 hours | 32 hours |
| 18.0 | 33.4 | 13.2 |

We claim:

1. A polyurethane containing a stabilizing amount of a mixture of co-operative amounts of (1) an organic oxime selected from the group consisting of acetoxime and cyclohexanone oxime, (2) an ultraviolet light absorber selected from the group consisting of 2,2'-dihydroxy-4-methoxybenzophenone and 2-(2-hydroxy-3,5-di-t-butylphenyl)-5-chlorobenzotriazole and (3) a phenolic antioxidant selected from the group consisting of 2,2'-methylenebis(4-methyl-6-tert.butylphenol), 4,4'-butylidenebis(6-t-butyl-m-cresol), the reaction product of (a) dicyclopentadiene, (b) formaldehyde and (c) isobutylene and 2,2'-methylenebis-(6-nonyl-p-cresol).

2. The polyurethane according to claim 1 wherein the oxime is acetoxime, the ultraviolet light absorber is 2,2'-dihydroxy-4-methoxy benzophenone and the antioxidant is 2,2'-methylene bis(4-methyl-6-tert. butylphenol).

3. The polyurethane according to claim 1 wherein in the oxime is acetoxime, the ultraviolet light absorber is 2-(2-hydroxy-3,5-di-t-butylphenyl)-5-chlorobenzotriazole and the antioxidant is 4,4'-butylidenebis(6-t-butyl-m-cresol).

4. The polyurethane according to claim 1 wherein the oxime is cyclohexanone oxime, the ultraviolet light absorber is 2-(2-hydroxy-3,5-di-t-butylphenyl)-5-chlorobenzotriazole and the antioxidant is 4,4'-butylidenebis(6-t-butyl-m-cresol).

5. The polyurethane according to claim 1 wherein the oxime is acetoxime, the ultraviolet light absorber is 2,2'-dihydroxy-4-methoxy benzophenone and the antioxidant is the reaction product of dicyclopentadiene, formaldehyde and isobutylene.

6. The polyurethane according to claim 1 wherein the oxime is acetoxime, the ultraviolet light absorber is 2,2'-dihydroxy-4-methoxy benzophenone and the antioxidant is 2,2'-methylenebis(6-nonyl-p-cresol).

7. The polyurethane according to claim 1 wherein the oxime is acetoxime.

8. The polyurethane according to claim 1 wherein the oxime is cyclohexanone oxime.

9. The polyurethane according to claim 1 wherein the ultraviolet light absorber is 2,2'-dihydroxy-4-methoxybenzophenone.

10. The polyurethane according to claim 1 wherein the ultraviolet light absorber is 2-(2-hydroxy-3,5-di-t-butylphenyl)-5-chlorobenzotriazole.

11. The polyurethane according to claim 1 wherein the phenolic antioxidant is 2,2'-methylenebis(4-methyl-6-tert.butylphenol).

12. The polyurethane according to claim 1 wherein the phenolic antioxidant is 4,4'-butylidenebis(6-t-butyl-m-cresol).

13. The polyurethane according to claim 1 wherein the phenolic antioxidant is the reaction product of (a) dicyclopentadiene, (b) formaldehyde and (c) isobutylene.

14. The polyurethane according to claim 1 wherein the phenolic antioxidant is 2,2'-methylenebis(6-nonyl-p-cresol).

15. A process for stabilizing a polyurethane from the deteriorative effects of ultraviolet light and nitrogen oxides which comprises adding thereto a stabilizing amount of a mixture of co-operative amounts of (1) an organic oxime selected from the group consisting of acetoxime and cyclohexanone oxime, (2) an ultraviolet light absorber selected from the group consisting of 2,2'-dihydroxy-4-methoxybenzophenone and 2-(2-hydroxy-3,5-di-t-butylphenyl)-5-chlorobenzotriazole, and (3) a phenolic antioxidant selected from the group consisting of 2,2'-methylenebis(4-methyl-6-tert.butylphenol), 4,4'-butylidenebis(6-t-butyl-m-cresol), the reaction product of (a) dicyclopentadiene, (b) formaldehyde and (c) isobutylene and 2,2'-methylenebis-(6-nonyl-p-cresol).

16. The process according to claim 15 wherein the oxime is acetoxime.

17. The process according to claim 15 wherein the oxime is cyclohexanone oxime.

18. The process according to claim 15 wherein the oxime is acetoxime, the ultraviolet light absorber is 2,2'-dihydroxy-4-methoxy benzophenone and the antioxidant is 2,2'-methylenebis(4-methyl-6-tert. butylphenol).

19. The process according to claim 15 wherein the oxime is acetoxime, the ultraviolet light absorber is 2-(2-hydroxy-3,5-di-t-butylphenyl)-5-chlorobenzotriazole and the antioxidant is 4,4'-butylidenebis(6-t-butyl-m-cresol).

20. The process according to claim 15 wherein the oxime is cyclohexanone oxime, the ultraviolet light absorber is 2-(2-hydroxy-3,5-di-t-butylphenyl)-5-chlorobenzotriazole and the antioxidant is 4,4'-butylidenebis(6-t-butyl-m-cresol).

21. The process according to claim 15 wherein the oxime is acetoxime, the ultraviolet light absorber is 2,2'-dihydroxy-4-methoxy benzophenone and the antioxidant is the reaction product of dicyclopentadiene, formaldehyde and isobutylene.

22. The process according to claim 15 wherein the oxime is acetoxime, the ultraviolet light abosrber is 2,2'-dihydroxy-4-methoxy benzophenone and the antioxidant is 2,2'-methylenebis(6-nonyl-p-cresol).

* * * * *